(12) United States Patent
Salter et al.

(10) Patent No.: US 10,759,330 B1
(45) Date of Patent: Sep. 1, 2020

(54) TIE-DOWN BRACKET FOR MOTOR VEHICLE

(71) Applicant: Ford Global Technologies, LLC, Dearborn, MI (US)

(72) Inventors: Stuart C. Salter, White Lake, MI (US); David Brian Glickman, Southfield, MI (US); Kevin Berington Johnson, Northville, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/411,510

(22) Filed: May 14, 2019

(51) Int. Cl.
| | |
|---|---|
| *B60Q 1/26* | (2006.01) |
| *B60Q 1/30* | (2006.01) |
| *B60Q 1/28* | (2006.01) |
| *B60Q 1/32* | (2006.01) |
| *B60Q 1/50* | (2006.01) |
| *B60Q 1/38* | (2006.01) |
| *B60R 9/04* | (2006.01) |
| *F21S 43/14* | (2018.01) |
| *F21W 107/10* | (2018.01) |

(Continued)

(52) U.S. Cl.
CPC ......... *B60Q 1/2661* (2013.01); *B60Q 1/2696* (2013.01); *B60Q 1/28* (2013.01); *B60Q 1/30* (2013.01); *B60Q 1/32* (2013.01); *B60Q 1/38* (2013.01); *B60Q 1/50* (2013.01); *B60R 9/04* (2013.01); *F21S 43/14* (2018.01); *F21W 2103/15* (2018.01); *F21W 2103/20* (2018.01); *F21W 2103/55* (2018.01); *F21W 2107/10* (2018.01); *F21Y 2113/13* (2016.08); *F21Y 2115/10* (2016.08)

(58) Field of Classification Search
CPC ...... B60Q 1/2661; B60Q 1/2696; B60Q 1/28; B60Q 1/30; B60Q 1/32; B60Q 1/38; B60Q 1/50; B60R 9/04; F21S 43/14
USPC ........................................................ 362/545
See application file for complete search history.

(56) References Cited

U.S. PATENT DOCUMENTS

| | | | | |
|---|---|---|---|---|
| 4,079,986 | A | * | 3/1978 | Redford ............. B62D 33/0604 180/89.13 |
| 4,099,658 | A | * | 7/1978 | Bott ..................... B60Q 1/2661 224/326 |

(Continued)

FOREIGN PATENT DOCUMENTS

| | | |
|---|---|---|
| CN | 203172547 U | 9/2013 |
| CN | 106122816 A | 11/2016 |
| FR | 2592133 A3 | 6/1987 |

OTHER PUBLICATIONS amazon.com, "Deuce-Style Dual LED White Amber Running Light Turn Signal Smoke Lens (1157 Bulb, White Amber LED)" Automotive. Downloaded from https://www.amazon.com/Deuce-Style-White-Amber-Running-Signal/dp/B079QLYHJ4/ref=sr_1_fkmrnull_1?keywords=Deuce+style+dual+LED+white+amber+running+ligh t+turn+signal+smoke+lens&qid=1557770419&s=gateway&sr=8-1-fkmrnull on Apr. 4, 2019.

(Continued)

*Primary Examiner* — Bryon T Gyllstrom
(74) *Attorney, Agent, or Firm* — David Coppiellie; Carlson, Gaskey & Olds, P.C.

(57) ABSTRACT

This disclosure relates to a tie-down bracket for a motor vehicle. The tie-down bracket includes at least one light. In this way, the tie-down bracket may function as one or more of a signature light, turn signal, cornering light, etc. A method is also disclosed.

20 Claims, 7 Drawing Sheets

(51) Int. Cl.
   *F21Y 115/10* (2016.01)
   *F21Y 113/13* (2016.01)
   *F21W 103/20* (2018.01)
   *F21W 103/55* (2018.01)
   *F21W 103/15* (2018.01)

(56) References Cited

U.S. PATENT DOCUMENTS

| | | |
|---|---|---|
| 4,819,139 A | 4/1989 | Thomas |
| 5,077,643 A | 12/1991 | Leach |
| 5,641,106 A | 6/1997 | Slaughter et al. |
| 8,057,081 B2 | 11/2011 | Schwab |
| 8,167,180 B2 * | 5/2012 | Bogoslofski .............. B60R 9/08 224/321 |
| 8,469,558 B2 | 6/2013 | Carmi |
| 8,966,795 B1 * | 3/2015 | Shipman ................ B60Q 1/503 40/592 |
| 9,010,976 B2 * | 4/2015 | Shipman ................ G09F 13/20 340/472 |
| 9,758,088 B1 * | 9/2017 | Salter .................... B60Q 1/0041 |
| 9,969,232 B2 | 5/2018 | Salter et al. |
| 2006/0226188 A1 * | 10/2006 | Smith ...................... B60R 9/04 224/326 |
| 2007/0217212 A1 * | 9/2007 | Klinkman ................ B60Q 1/24 362/493 |
| 2011/0149560 A1 * | 6/2011 | Jessup ...................... F21L 4/08 362/183 |
| 2012/0031939 A1 * | 2/2012 | Jutila ...................... B60Q 1/24 224/326 |
| 2013/0249252 A1 * | 9/2013 | Schmid .................. B60R 9/058 296/210 |
| 2015/0049500 A1 | 2/2015 | Sakarian et al. |
| 2016/0121799 A1 * | 5/2016 | McClintock ......... B60Q 1/2661 224/309 |
| 2018/0154822 A1 * | 6/2018 | Salter .................. B60Q 1/2611 |

OTHER PUBLICATIONS

Abell Hobby, Realistic 1/10 Front Bumper with LED Lights & Towing Hooks for SCX-10 40mm Mount (C25539SILVERBLACK), Downloaded from https://www.abellhobby.com/Realistic-1-10-Front-Bumper-with-LED-Lights-p/intc25539silverblack.htm on Apr. 4, 2019.

Oliver, J. Brent, "Hooked on My Escape," Downloaded from www.hookedonmyescape.com on Apr. 4, 2019. Copyright 2012-2015.

Oak Orchard Canoe Kayak Experts, "Wonder Bar Roof Rack," Downloaded from https://www.oakorchardcanoe.com/wonderbar.php on Apr. 4, 2019. Copyright 1999-2019.

* cited by examiner

TIE-DOWN BRACKET FOR MOTOR VEHICLE

TECHNICAL FIELD

This disclosure relates to a tie-down bracket for a motor vehicle.

BACKGROUND

Users often transport items such as luggage, canoes, kayaks, bicycles, skis, etc., by securing them to the roof of a vehicle. Such items may be secured to the roof using tie-downs.

SUMMARY

A vehicle assembly according to an exemplary aspect of the present disclosure includes, among other things, a tie-down bracket including at least one light.

In a further non-limiting embodiment of the foregoing vehicle assembly, the tie-down bracket includes an opening configured to receive a tie-down.

In a further non-limiting embodiment of any of the foregoing vehicle assemblies, the tie-down bracket includes a forward section and a rearward section, and the forward section is inclined relative to the rearward section.

In a further non-limiting embodiment of any of the foregoing vehicle assemblies, the at least one light includes a plurality of forward-facing lights adjacent a superior surface of the forward section, and the forward-facing lights are configured to direct light in a forward direction.

In a further non-limiting embodiment of any of the foregoing vehicle assemblies, the forward-facing lights provide one of signature lights and off-road lights.

In a further non-limiting embodiment of any of the foregoing vehicle assemblies, the forward-facing lights are spaced-apart from one another along a length dimension of the tie-down bracket, and each of the forward-facing lights is configured to illuminate one of a first color and a second color.

In a further non-limiting embodiment of any of the foregoing vehicle assemblies, a quantity of the forward-facing lights are selectively illuminated the first color corresponding to a battery state of charge.

In a further non-limiting embodiment of any of the foregoing vehicle assemblies, a first group of the forward-facing lights provides off-road lights, a second group of the forward-facing lights provides one of signature lights and daytime running lights, and a third group of the forward-facing lights provides a turn signal.

In a further non-limiting embodiment of any of the foregoing vehicle assemblies, the at least one light includes a plurality of side-facing lights adjacent a lateral surface of the forward section, and the side-facing lights are configured to direct light in a lateral direction.

In a further non-limiting embodiment of any of the foregoing vehicle assemblies, the side-facing lights provide one of cornering lights and marker lights.

In a further non-limiting embodiment of any of the foregoing vehicle assemblies, the at least one light includes a rear-facing light adjacent a rear surface of the tie-down bracket, and the rear-facing light is visible from inside a vehicle.

In a further non-limiting embodiment of any of the foregoing vehicle assemblies, the rear-facing light provides one of a turn signal indicator, a battery state of charge indicator, a battery charging status indicator, and an auxiliary light.

In a further non-limiting embodiment of any of the foregoing vehicle assemblies, the rear-facing light mimics lights arranged on another surface of the tie-down bracket.

In a further non-limiting embodiment of any of the foregoing vehicle assemblies, the at least one light is a light emitting diode (LED) mounted to a printed circuit board (PCB), the tie-down bracket includes an inner optic arranged between the LED and an outer lens, and the tie-down bracket is formed at least partially of a thermally conductive plastic material.

In a further non-limiting embodiment of any of the foregoing vehicle assemblies, the assembly includes a controller configured to control the at least one light. The controller is connected to the at least one light via one of a controller area network, local interconnect network, and a wireless connection.

In a further non-limiting embodiment of any of the foregoing vehicle assemblies, the tie-down bracket is arranged between a hood of a vehicle and a front quarter panel.

A method according to an exemplary aspect of the present disclosure includes, among other things, illuminating at least one light on a tie-down bracket of a vehicle.

In a further non-limiting embodiment of the foregoing method, the at least one light directs light in a forward direction and provides one of a signature light, a daytime running light, a turn signal, an off-road light, and a battery charge indicator.

In a further non-limiting embodiment of any of the foregoing methods, the at least one light directs light in a lateral direction and provides one of a cornering light and a marker light.

In a further non-limiting embodiment of any of the foregoing methods, the at least one light directs light in a rearward direction and provides one of a turn signal indicator, a battery state of charge indicator, a battery charging status indicator, and an auxiliary light.

DETAILED DESCRIPTION

This disclosure relates to a tie-down bracket for a motor vehicle. The tie-down bracket includes at least one light. In this way, the tie-down bracket may function as one or more of a signature light, turn signal, cornering light, etc. These and other benefits will be appreciated from the below description.

Figure 1:
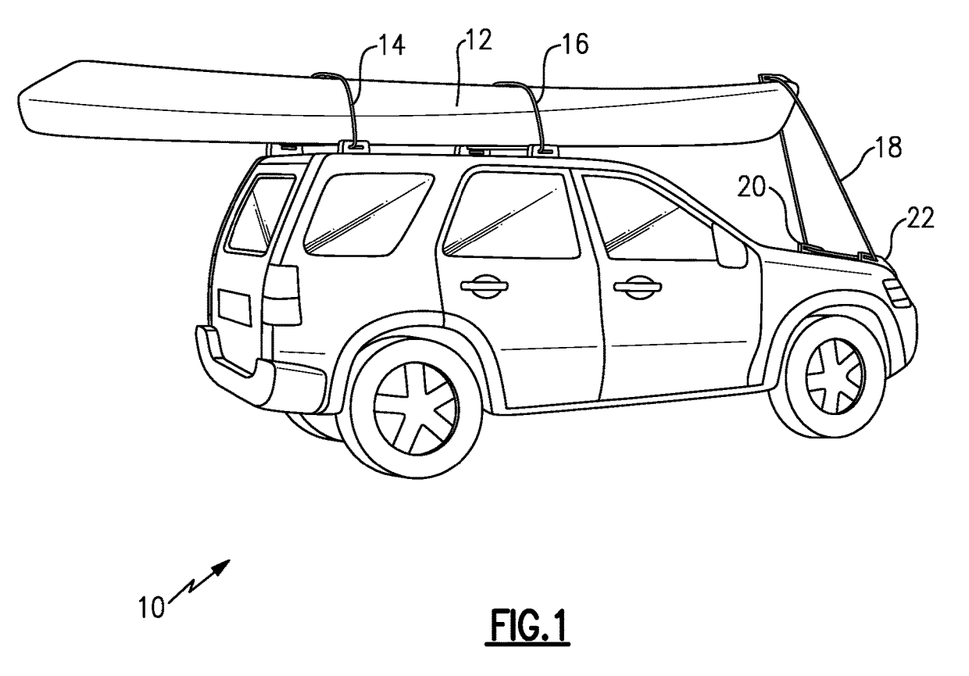
FIG. 1 is a rear-perspective view of a motor vehicle with an item secured to a roof.

Referring to the drawings, FIG. 1 is a rear-perspective view of a motor vehicle 10. While an SUV is pictured in FIG. 1, this disclosure is also applicable to other types of vehicles. In FIG. 1, an item 12, which in this example is a kayak, is secured to a roof of the vehicle 10 using tie-downs, such as ropes, cables, straps, cords, etc. In this example, there are three tie-downs 14, 16, 18 holding the item 12 in place. First and second tie-downs 14, 16 are connected to a roof rack of the vehicle 10. The front tie-down 18 is connected to a body of the vehicle 10 by way of first and second tie-down brackets 20, 22. While two tie-down brackets 20, 22 are shown in FIG. 1, it should be understood that this disclosure extends to vehicles with one or more tie-down brackets. The detail of one of the tie-down brackets will be described below, however it should be understood that first and second tie-down brackets 20, 22 are substantially identical.

Figure 2:
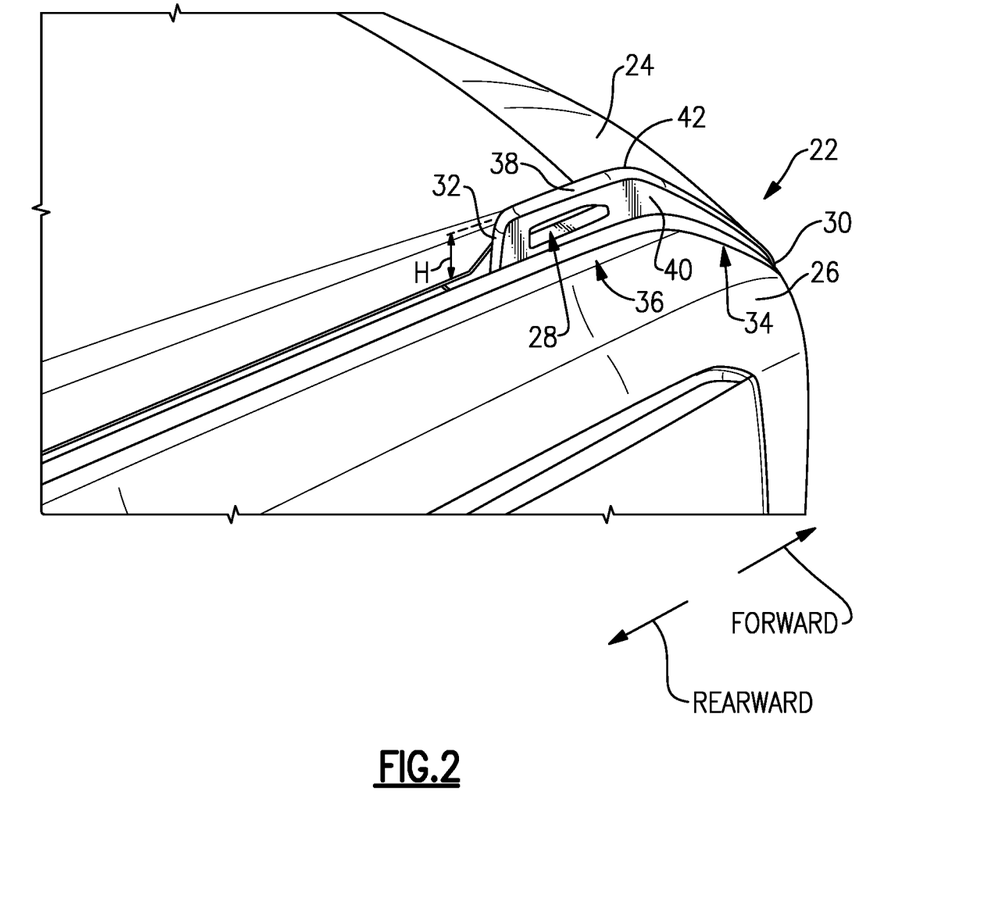
FIG. 2 is a rear-perspective view of an example tie-down bracket.
Figure 3:
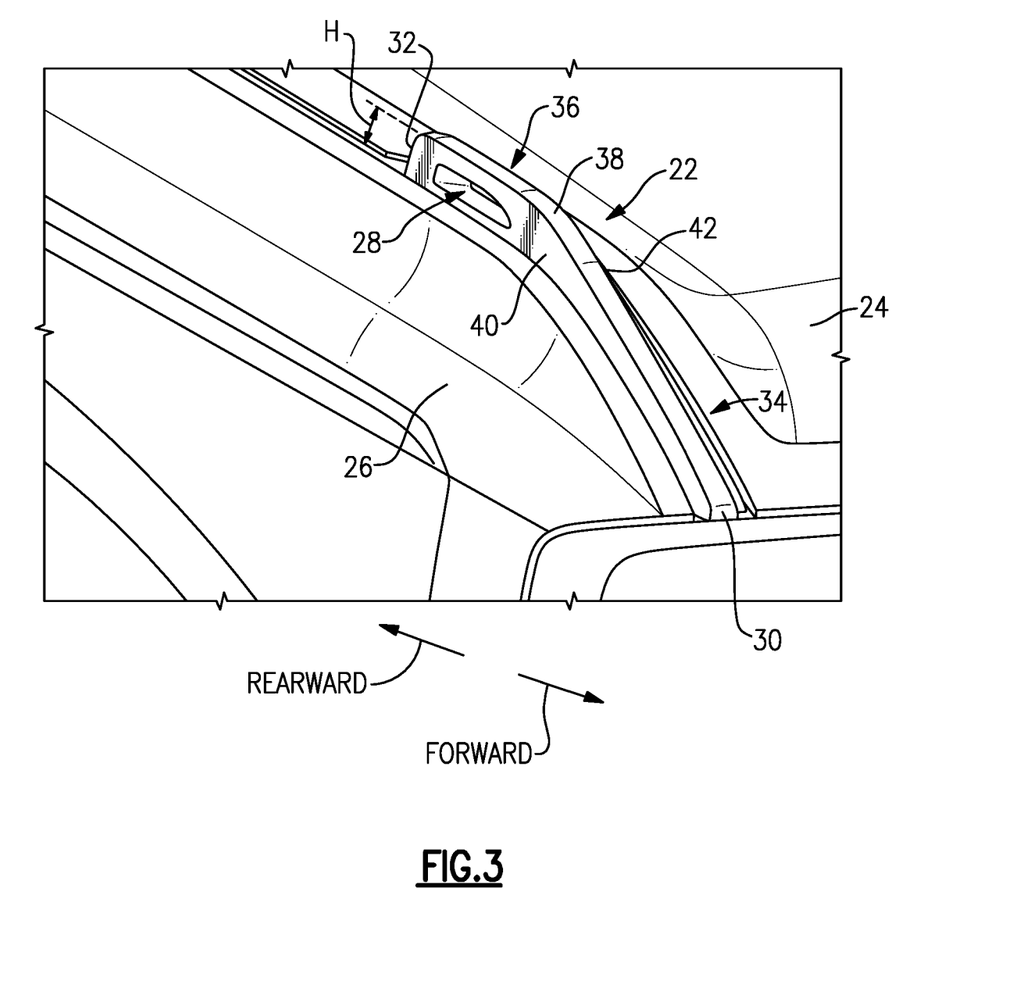
FIG. 3 is a front-perspective view of the tie-down bracket.

FIGS. 2 and 3 illustrate the tie-down bracket 22 in more detail. The "forward" and "rearward" directions are labeled in FIGS. 2 and 3 for ease of reference. The "forward" and "rearward" directions correspond to the normal "forward" and "rearward" orientations of the vehicle 10.

In this example, the tie-down bracket 22 is arranged in a space between a hood 24 and a front quarter panel 26 of the vehicle 10. It should be understood that the tie-down bracket 22 may be arranged in other locations, however. When the hood 24 is closed, as in FIGS. 2 and 3, the tie-down bracket 22 projects above the hood 24 and the front quarter panel 26. The tie-down bracket 22 includes an opening 28 configured to receive a tie-down, such as tie-down 18.

The tie-down bracket 22 includes a body, which may be a one-piece or multi-piece body, having a front surface 30 and a rear surface 32. In this example, the front surface 30 is substantially coterminous with a front of the hood 24 and a front of the front quarter panel 26. A length dimension of the tie-down bracket 22 extends between the front surface 30 and the rear surface 32, and further extends substantially parallel to a vehicle centerline. The opening 28 extends through the tie-down bracket 22 in a direction substantially normal to the vehicle centerline and to the length dimension of the tie-down bracket 22.

The tie-down bracket 22, in this example, includes a forward section 34 adjacent the front surface 30 and a rear section 36 adjacent the rear surface 32. The opening 28 is provided in the rear section 36, in this example. Further, the forward section 34 and the rear section 36 are inclined relative to one another, in this example. In particular, the rear section 36 is substantially parallel to a ground surface, and the front section 34 is inclined such that the tie-down bracket 22 slopes toward the ground surface approaching the front surface 30.

The tie-down bracket 22 includes a superior (i.e., top) surface 38 extending between a lateral (i.e., outer side) surface 40 and a medial (i.e., inner side) surface 42. The tie-down bracket 22 projects above the hood 24 when the hood 24 is closed by a height dimension H. The height dimension H extends from a top of the hood 24 to the superior surface 38. The height dimension H is substantially constant along the rear section 36. The height dimension H gradually reduces in dimension throughout the front section 34 approaching the front surface 30.

Figure 4:
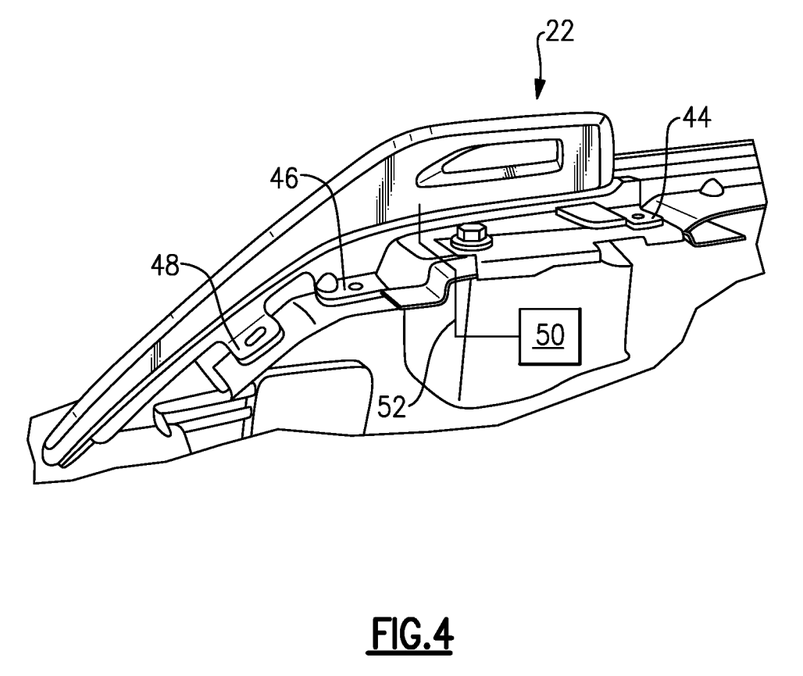
FIG. 4 is a front-perspective view of the tie-down bracket with a hood of the vehicle removed for ease of reference.

FIG. 4 is a side-perspective view of the tie-down bracket 22 with the hood 24 removed for ease of reference. In this example, the tie-down bracket 22 includes a plurality of tabs 44, 46, 48 configured to attach to a body of the vehicle 10 beneath the hood 24. The tabs 44, 46, 48 may include openings configured to receive fasteners, such as bolts.

In an aspect of this disclosure, the tie-down bracket 22 is selectively removable and/or replaceable. In particular, a user could selectively remove the tie-down bracket 22 and replace it with another type of tie-down bracket. Such tie-down brackets may be aftermarket accessories or included on the factory model of the vehicle 10.

The tie-down bracket 22, in this example, includes at least one light configured to be selectively illuminated. As will be explained below, the at least one light may be configured to provide information about the vehicle, to light the roadway for the driver, or to increase the visibly of the vehicle.

Figure 5:
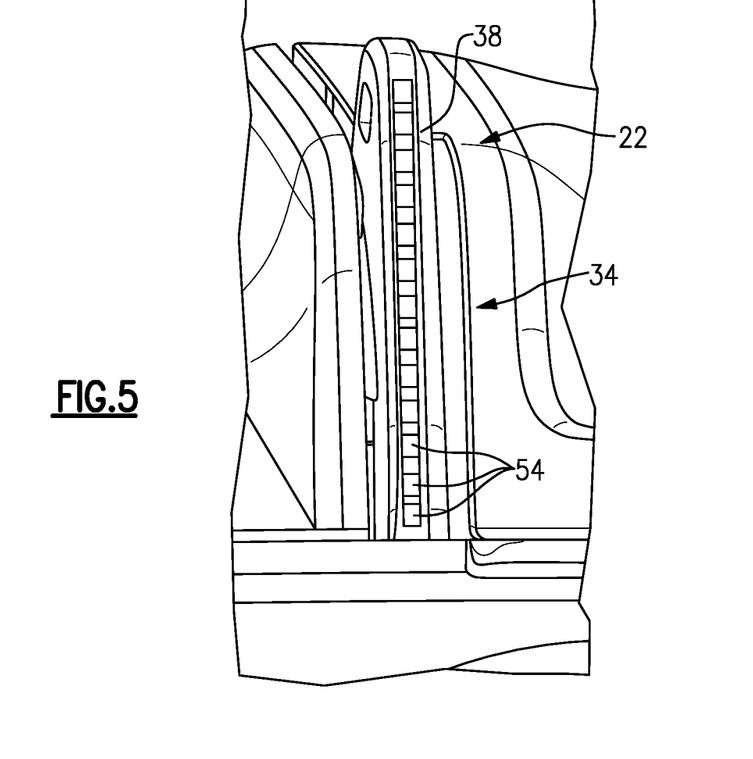
FIG. 5 is a front view of the tie-down bracket and illustrates a first example lighting arrangement.

FIG. 5 illustrates a first example lighting arrangement. In FIG. 5, the tie-down bracket 22 includes a plurality of forward-facing lights 54, which are spaced-apart from one another along the length of the tie-down bracket 22 and are arranged adjacent the superior surface 38. In particular, the forward-facing lights 54 are arranged in the front section 34 and are recessed slightly beneath the superior surface 38 because they are covered by one or more optical elements, as will be discussed below. The arrangement of the forward-facing lights 54 and the optical element(s) is such that the forward-facing lights 54 are configured to direct light in the forward direction.

The forward-facing lights 54 are each light emitting diodes (LEDs) in this example. Each forward-facing light 54 can be individually activated by the controller 50. In a particular example, each forward-facing light 54 is a bi-color LED configured to emit either an amber or a white color. The controller 50 is operable to activate each of the forward-facing lights 54 such that they emit one of the two colors (i.e., amber or white). The controller 50 is also configured to adjust an intensity of the light emitted from the forward-facing lights 54. The forward-facing lights 54, thus, may be used for a number of purposes.

As examples, the forward-facing lights 54 may be selectively activated by the controller 50 to provide one of signature lights, off-road lights, daytime running lights, or a turn signal. In a particular example, the controller 50 may selectively activate certain groups of the forward-facing lights 54 such that the groups provide different lighting functions. For instance, the controller 50 may activate one group of the forward-facing lights 54 to provide signature lights, another group to provide off-road lights and/or daytime running lights, and yet another group to provide a turn signal.

In yet another example, the forward-facing lights 54 are configured to indicate a battery state of charge (SOC). This aspect of the disclosure may be particularly useful when the vehicle 10 is an electrified vehicle, such as a plug-in hybrid electric vehicle (PHEV) or battery electric vehicle (BEV). In the example, the controller 50 illuminates a quantity of the forward-facing lights 54 a particular color corresponding to the SOC of the battery. For instance, if the SOC of the battery is 60%, then 60% of the forward facing lights 54, beginning at the bottom and moving toward the top, would be illuminated a first color to represent a bar filled 60% of the way to the top. The remaining 40% of the forward-facing lights 54 may be deactivated or be illuminated a second color different than the first color. The forward-facing lights 54 may indicate the SOC of the battery when requested by the user or at certain times such as when a user unlocks the vehicle 10 using a remote key fob, for example.

Figure 6:
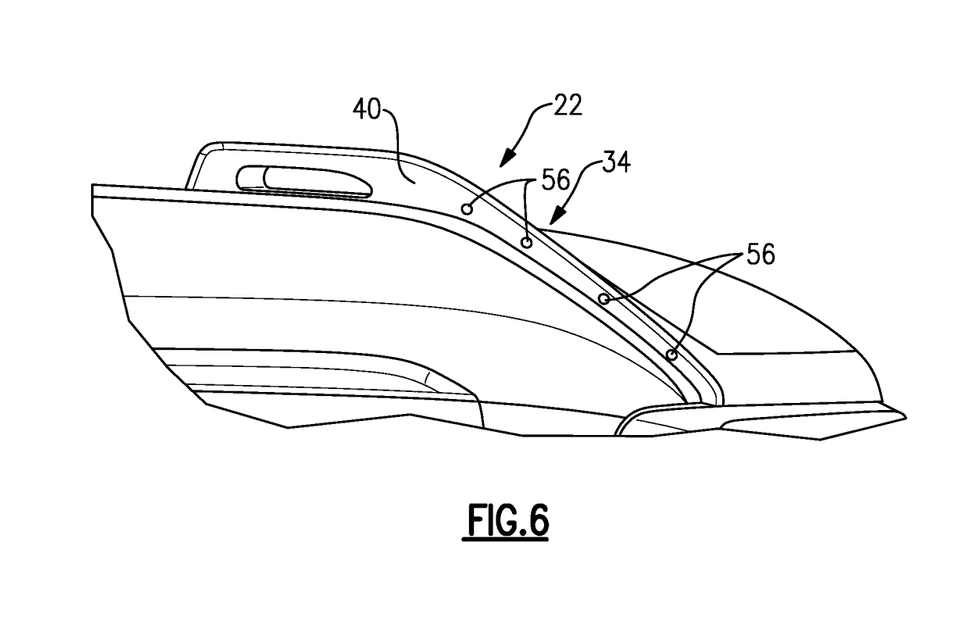
FIG. 6 is a side view of the tie-down bracket and illustrates a second example lighting arrangement.

FIG. 6 illustrates a second example lighting arrangement. In FIG. 6, the tie-down bracket 22 includes a plurality of side-facing lights 56 arranged adjacent the lateral surface 40. In particular, the side-facing lights 56 are arranged just beneath the lateral surface 40, and are spaced-apart from one another along the length of the tie-down bracket 22. The tie-down bracket 22 may include optical elements arranged relative to the side-facing lights 56. The side-facing lights 56 are arranged on the forward section 34 of the tie-down bracket 22. The side-facing lights 56 are LEDs, in one example, and each of the side-facing lights 56 are selectively activated by the controller 50.

The side-facing lights 56 are configured to direct light in a lateral direction relative to the vehicle 10. In a particular example, the controller 50 is configured to selectively activate the side-facing lights 56 such that they provide cornering lights or marker lights.

Figure 7:
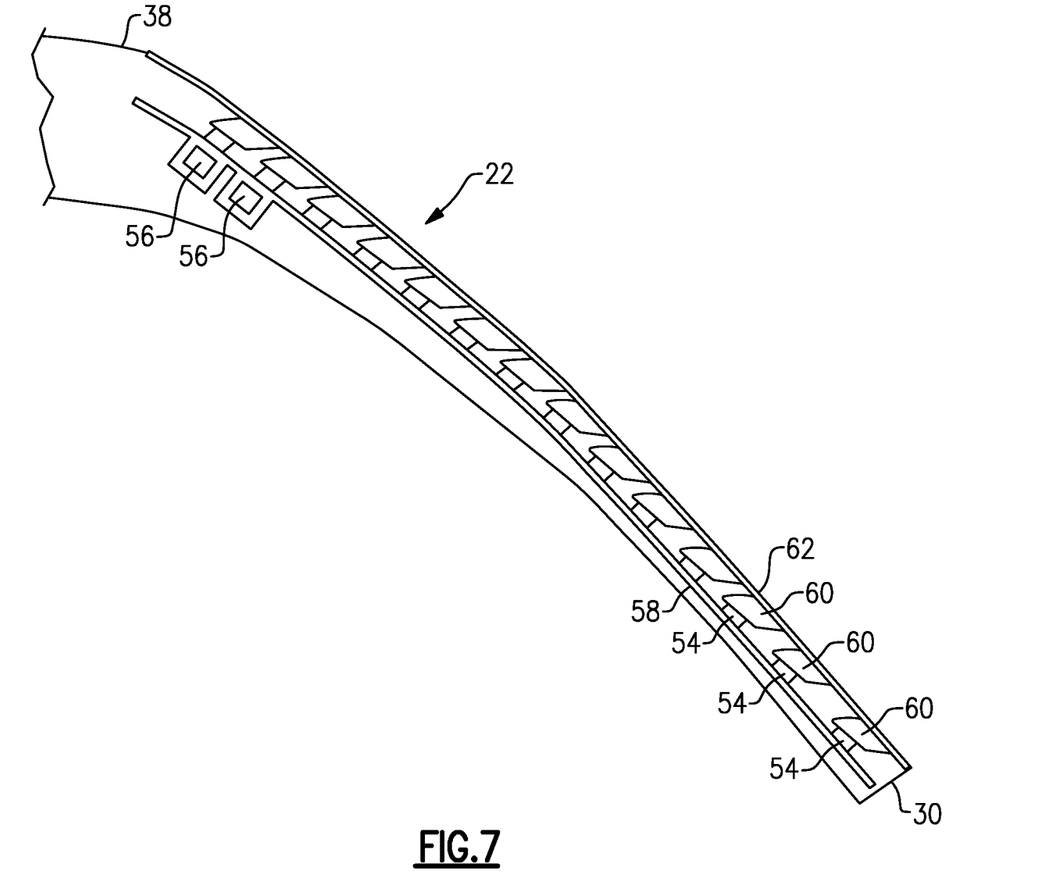
FIG. 7 is a somewhat schematic, cross-sectional view of a portion of the tie-down bracket.

FIG. 7 is a somewhat schematic cross-sectional representation of a portion of the tie-down bracket 22. As shown, the tie-down bracket 22 includes a printed circuit board (PCB) 58 on which the forward-facing lights 54 and the side-facing lights 56 are arranged. The PCB may be bent ninety-degrees to support the side-facing lights 56. Only two side-facing lights 56 are shown in FIG. 7.

Between the forward-facing lights 54 and the superior surface 38, the tie-down bracket 22 includes an inner optical element 60 and an outer optical element 62. In this example, the inner optical element 60 is a light guide. Each of the forward-facing lights includes its own, respective light guide. The outer optical element 62 is a lens and is flush with the superior surface 38. The inner optical elements 60 and the outer optical element 62 are arranged and configured to direct light from the forward-facing lights 54 in the forward direction. A similar arrangement of optical elements is arranged relative to the side-facing lights 56, and is configured to direct light from the side-facing lights 56 in the lateral direction.

The tie-down bracket 22 may be made at least partially from thermally conductive plastic. The tie-down bracket 22 may made by overmolding the LEDs, PCB, optical elements, and other components, such as heat sinks and electrical harnesses. Further, the PCB 58 may be thermally conductive, and may be made of thermally conductive plastic and or aluminum, as examples. Making the tie-down bracket 22 of thermally conductive materials increases the ability of the tie-down bracket 22 to dissipate heat and also increases the ease of defrosting the tie-down bracket 22. In a particular aspect of this disclosure, the controller 50 may increase the intensity of the light of the forward-facing and side-facing lights 54, 56 in low temperature conditions in an effort to generate heat and defrost the tie-down bracket 22.

Figure 8:
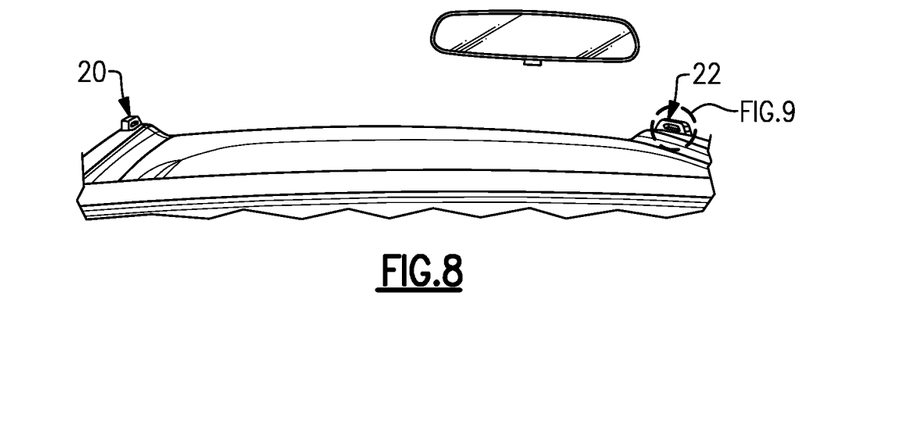
FIG. 8 is a view from an interior of the vehicle of two tie-down brackets.

A third example lighting arrangement will now be described relative to FIGS. 8 and 9. FIG. 8 is representative of a view of the first and second tie-down brackets 20, 22 from an interior of the vehicle 10. In particular, the rear surfaces of the tie-down brackets 20, 22 are readily visible from the interior of the vehicle. The third example lighting arrangement includes providing lights on the rear surfaces of the tie-down brackets 20, 22.

Figure 9:
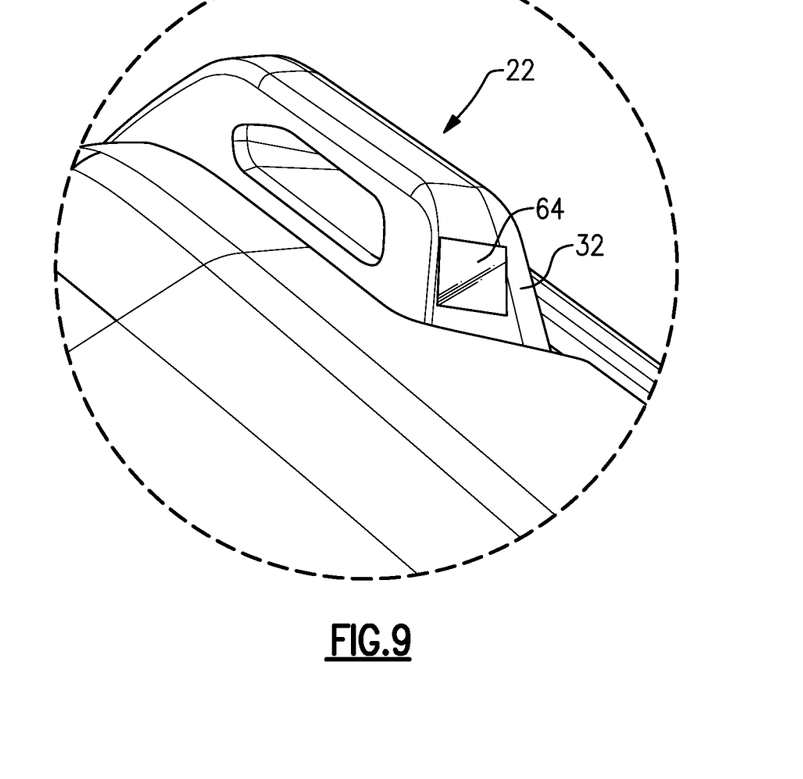
FIG. 9 is a close-up view of the encircled area in FIG. 8 and illustrates a third example lighting arrangement.

As shown in FIG. 9, the rear surface 32 of the tie-down bracket 22 includes a rear-facing light 64. The rear-facing light 64 is arranged adjacent the rear surface 32, and in particular may be recessed slightly below the rear surface 32. Optical elements such as those discussed relative to the forward-facing lights 54 may be arranged between the rear-facing light 64 and the rear surface 32. The rear-facing light 64 may be an LED and may be selectively activated by the controller 50. The rear-facing light 64 may also be a screen and in particular may be configured to display numbers, letters, and symbols.

The rear-facing light 64 is visible from inside the vehicle 10. The rear-facing light 64 may provide a turn signal indicator, a battery state of charge indicator, a battery charging status indicator (i.e., whether the battery is actively charging or not, or on plug or not), and an auxiliary light (i.e., a low fuel, low oil, low washer fluid, traction control event indicator). In another example, the rear-facing light 64 mimics what the functionality of the forward-facing lights 54. For instance, if the forward-facing lights 54 are being used as a turn signal, the rear-facing light 64 is also used as a turn signal. If the forward-facing lights 54 change from being used as a turn signal to indicating battery SOC, then the rear-facing light 64 is also used to indicate battery SOC, as so on.

While they are shown separately, the first, second, and third example lighting arrangements may be used in combination with one another. For instance, a tie-down bracket could include each of the forward-facing lights, side-facing lights, and a rear-facing light, or any combination of the three lighting arrangements.

It should be understood that terms such as "about," "substantially," and "generally" are not intended to be boundaryless terms, and should be interpreted consistent with the way one skilled in the art would interpret those terms. Further, directional terms such as "superior," "lateral," "medial," "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle assembly, comprising:
   a tie-down bracket including at least one light, wherein the tie-down bracket includes an opening configured to receive a tie-down, and wherein the tie-down bracket is arranged between a hood of a vehicle and a front quarter panel of the vehicle.

2. The vehicle assembly as recited in claim 1, wherein:
   the tie-down bracket includes a forward section and a rearward section, and
   the forward section is inclined relative to the rearward section.

3. The vehicle assembly as recited in claim 2, wherein:
   the at least one light includes a plurality of forward-facing lights adjacent a superior surface of the forward section, and
   the forward-facing lights are configured to direct light in a forward direction.

4. The vehicle assembly as recited in claim 3, wherein the forward-facing lights provide one of signature lights and off-road lights.

5. The vehicle assembly as recited in claim 3, wherein:
the forward-facing lights are spaced-apart from one another along a length dimension of the tie-down bracket, and
each of the forward-facing lights is configured to illuminate one of a first color and a second color.

6. The vehicle assembly as recited in claim 5, wherein a quantity of the forward-facing lights are selectively illuminated the first color corresponding to a battery state of charge.

7. The vehicle assembly as recited in claim 5, wherein:
a first group of the forward-facing lights provides off-road lights,
a second group of the forward-facing lights provides one of signature lights and daytime running lights, and
a third group of the forward-facing lights provides a turn signal.

8. The vehicle assembly as recited in claim 2, wherein:
the at least one light includes a plurality of side-facing lights adjacent a lateral surface of the forward section, and
the side-facing lights are configured to direct light in a lateral direction.

9. The vehicle assembly as recited in claim 8, wherein the side-facing lights provide one of cornering lights and marker lights.

10. The vehicle assembly as recited in claim 2, wherein:
the at least one light includes a rear-facing light adjacent a rear surface of the tie-down bracket, and
the rear-facing light is visible from inside a vehicle.

11. The vehicle assembly as recited in claim 10, wherein the rear-facing light provides one of a turn signal indicator, a battery state of charge indicator, a battery charging status indicator, and an auxiliary light.

12. The vehicle assembly as recited in claim 10, wherein the rear-facing light mimics lights arranged on another surface of the tie-down bracket.

13. The vehicle assembly as recited in claim 1, wherein:
the at least one light is a light emitting diode (LED) mounted to a printed circuit board (PCB),
the tie-down bracket includes an inner optic arranged between the LED and an outer lens, and
the tie-down bracket is formed at least partially of a thermally conductive plastic material.

14. The vehicle assembly as recited in claim 1, further comprising a controller configured to control the at least one light, wherein the controller is connected to the at least one light via one of a controller area network, local interconnect network, and a wireless connection.

15. The vehicle assembly as recited in claim 1, further comprising a roof rack, and wherein an item is secured to the roof rack via a tie-down connected to the roof rack and also passing through the opening in the tie-down bracket.

16. The vehicle assembly as recited in claim 1, wherein an entire perimeter of the opening is defined by the tie-down bracket.

17. A method, comprising:
illuminating at least one light on a tie-down bracket of a vehicle, wherein the tie-down bracket includes an opening configured to receive a tie-down, and wherein the tie-down bracket is arranged between a hood of a vehicle and a front quarter panel of the vehicle.

18. The method as recited in claim 17, wherein the at least one light directs light in a forward direction and provides one of a signature light, a daytime running light, a turn signal, an off-road light, and a battery charge indicator.

19. The method as recited in claim 17, wherein the at least one light directs light in a lateral direction and provides one of a cornering light and a marker light.

20. The method as recited in claim 17, wherein the at least one light directs light in a rearward direction and provides one of a turn signal indicator, a battery state of charge indicator, a battery charging status indicator, and an auxiliary light.

* * * * *